(12) United States Patent
Reckwell et al.

(10) Patent No.: US 12,181,850 B2
(45) Date of Patent: Dec. 31, 2024

(54) DYNAMIC COORDINATION AND EXECUTION OF INDEPENDENT HETEROGENEOUS PROGRAM UNITS

(71) Applicant: Robert Bosch GmbH, Stuttgart (DE)

(72) Inventors: Jens Reckwell, Meiningen (DE); Sebastian Stuermer, Obersinn (DE); Sebastian Krauskopf, Gemuenden (DE)

(73) Assignee: Robert Bosch GmbH, Stuttgart (DE)

( * ) Notice: Subject to any disclaimer, the term of this patent is extended or adjusted under 35 U.S.C. 154(b) by 966 days.

(21) Appl. No.: 16/952,280

(22) Filed: Nov. 19, 2020

(65) Prior Publication Data

US 2021/0149722 A1    May 20, 2021

(30) Foreign Application Priority Data

Nov. 20, 2019  (DE) .................... 10 2019 217 848.0

(51) Int. Cl.
*G05B 19/042*  (2006.01)
*G05B 19/04*  (2006.01)

(52) U.S. Cl.
CPC ....... *G05B 19/0426* (2013.01); *G05B 19/041* (2013.01); *G05B 2219/2609* (2013.01)

(58) Field of Classification Search
CPC ............. G05B 19/0426; G05B 19/041; G05B 2219/2609
See application file for complete search history.

(56) References Cited

U.S. PATENT DOCUMENTS

| | | | | |
|---|---|---|---|---|
| 6,654,666 B1* | 11/2003 | Terada | ................ | G05B 19/425 700/250 |
| 9,158,512 B1* | 10/2015 | Hucik | ....................... | G06F 8/41 |
| 2007/0162157 A1* | 7/2007 | Chandhoke | .......... | G05B 19/056 700/17 |
| 2008/0052348 A1* | 2/2008 | Adler | ..................... | H04L 67/04 709/217 |
| 2015/0331407 A1* | 11/2015 | Lee | ...................... | G05B 19/056 700/86 |
| 2016/0004754 A1* | 1/2016 | Zoheir | ............. | G06F 16/24542 707/718 |
| 2019/0025788 A1* | 1/2019 | Ganapathi | ........... | G06F 9/44536 |
| 2021/0232370 A1* | 7/2021 | Suzuki | ................... | B25J 9/1658 |

OTHER PUBLICATIONS

Benedettelli, D., "Creating Cool MINDSTORMS NXT Robots," 2008 (4 pages).

* cited by examiner

*Primary Examiner* — Santosh R Poudel
(74) *Attorney, Agent, or Firm* — Maginot, Moore & Beck LLP

(57) ABSTRACT

A method for executing heterogeneous program units of a program, in particular for controlling an automated system, includes forming, using a central management unit, an execution unit including program sequences having a plurality of instances of the heterogeneous program units. The heterogeneous program units are chosen from a set of the heterogeneous program units which are registered on the central management unit. The method further includes executing the plurality of instances of the heterogeneous program units of the execution unit according to a configured sequence.

11 Claims, 3 Drawing Sheets

DYNAMIC COORDINATION AND EXECUTION OF INDEPENDENT HETEROGENEOUS PROGRAM UNITS

This application claims priority under 35 U.S.C. § 119 to patent application no. DE 10 2019 217 848.0, filed on Nov. 20, 2019 in Germany, the disclosure of which is incorporated herein by reference in its entirety.

The disclosure relates to a method for executing heterogeneous program units of a program, in particular for controlling an automated system, and a computing unit and a computer program to carry out the method.

BACKGROUND

In various industrial applications, such as, for example, movement controls, machine controls, robot controls, etc., fixed program sequences are conventionally used to control system functions. The entire sequence must be designed, configured and compiled completely in one development environment or in one programming language. The compilation is then transferred onto the runtime environment, e.g. a controller, and is executed there as a complete program. Modifications of the program sequence or of the order of execution of individual segments are then no longer possible. Similarly, programs in different languages or system-specific and user-specific program units independent from one another cannot easily be integrated together into a program sequence or coordinated with one another.

It is therefore desirable to provide a facility for the dynamic adaptation and coordination of program sequences.

SUMMARY

A method is proposed according to the disclosure for executing heterogeneous program units of a program, in particular for controlling an automated system, and a computing unit and a computer program to carry out said method with the features of the independent patent claims. Advantageous designs form the subject-matter of the subclaims and the following description.

According to the disclosure, an execution unit (task) which has program sequences having a plurality of instances of program units is first formed by a central management unit. The program units are chosen from a set of program units which are registered on the central management unit. The instances of the program units of the execution unit are then executed according to a configured sequence. In this way, a coordinated program sequence can be formed from a pool of registered, independent program units. The program units are thus freely functionally programmable, and internal and external program units are combinable on an equal basis.

The program units can preferably be written in at least two different programming languages, but can, in principle, also all be written in the same language. Any languages can be used, provided that a suitable interface for communication with the management unit is possible, for example domain-specific languages (DSL) which are provided in each case for defined, specific applications, or universal languages can also be used. Different program units could, for example, be written in C, C++, Python, languages for programmable logic controllers (e.g. languages according to EN 61131-3), etc. Each program unit can be configured to access variables in a common data structure, wherein the variables in the common data structure are created by the central management unit.

In one embodiment, the method can further comprise inserting a further program unit into the formed execution unit, wherein the configured sequence for executing the instances of the program units can be adapted with the inserted program unit. The program unit is flexibly instantiated in runtime through such a dynamic insertion of a program unit from the resource pool into an execution unit at any position.

The method can further comprise receiving variables from a registered program unit and generating or deleting the variables in the common data structure. It is thus ensured by the management unit that uniform variables are used and each of the program units can have access to these variables.

In one embodiment, a command execution can be coordinated in a plurality of program units of an execution unit by transmitting a begin command for a command to each of the plurality of program units to initiate the command execution, and the command execution is ended if at least one of the participating program units denies the command execution in response to the begin command. A begin command of this type enables the program units to respond positively to or deny a pending command execution.

In addition, the transmission of an execution command for the command to each of the plurality of program units can be provided, and also a cyclical repetition of the transmission of the execution command until a confirmation message relating to the execution of the command has been received from each of the plurality of program units. In this way, a synchronized execution of the command by a plurality of program units is ensured.

Finally, an end command can be transmitted to each of the plurality of program units if the command execution has been ended or the command has been successfully executed.

Commands which can be executed in this way can be predefined, for example, in the management unit or can be registered there by one of the program units so that a flexible adaptation of the existing commands and sequences in the system is possible.

A computing unit according to the disclosure, e.g. a control unit of a processing machine or a robot unit is, in particular configured through programming to carry out a method according to the disclosure.

The computing unit is preferably formed in a control unit of an industrial plant. In industrial automation technology, for example for factory automation or for process automation, devices that are used may, for example, be part of machines or plants, such as machine tools, production machines and/or handling machines which are normally controlled by a control unit. Control units of this type are, for example, designed as a computerized numerical control (CNC) or as a programmable logic controller (PLC) or as a motion control (MC). They have numerous inputs and outputs (I/O), e.g. analog and digital, and are connected to field devices, for example to sensors and actuators, and other control units of the machine or plant, for example via analog, digital and/or network connections. The control unit can thus receive data, in particular measured values, from the sensors and can control the individual actuators by means of corresponding signals. The control units normally have a plurality of different data connections, in particular Ethernet (or industrial Ethernet (fieldbus)) for the data exchange.

The implementation of a method according to the disclosure in the form of a computer program or computer program product with program code to carry out all method steps is also advantageous. Suitable data media for providing the computer program are, in particular, magnetic, optical and electrical storage devices, such as e.g. hard disks, flash memories, DVDs and the like. A download of a program via computer networks (Internet, Intranet, etc.) is also possible.

Further advantages and designs of the disclosure can be found in the description and the attached drawing.

The features mentioned above and still to be explained below are obviously usable not only in the respectively indicated combination, but also in other combinations or in isolation without departing the scope of the disclosure.

The disclosure is shown schematically in the drawing on the basis of example embodiments and is described in detail below with reference to the drawing.

DETAILED DESCRIPTION

Figure 1:
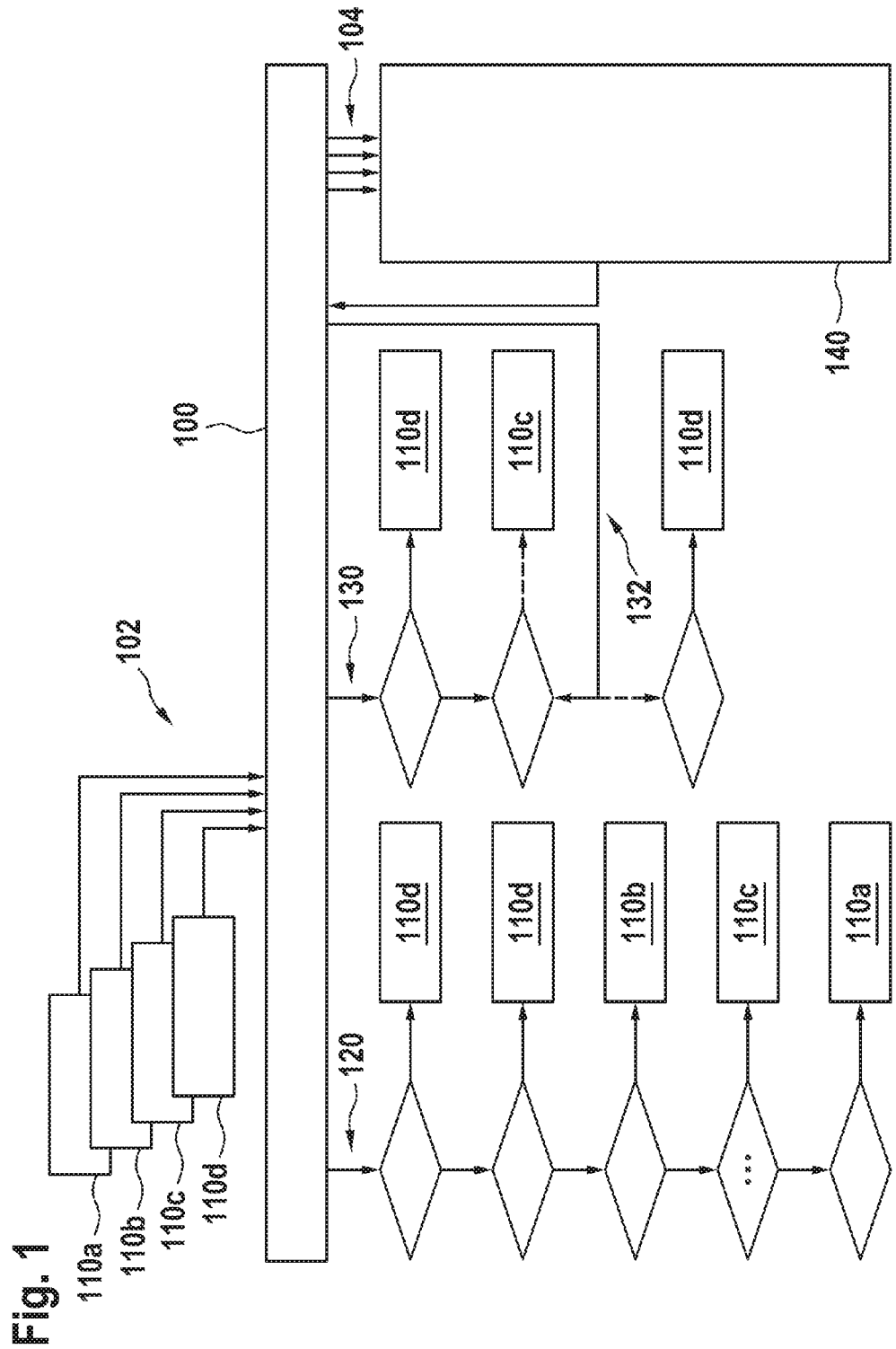
FIG. 1 shows a block diagram of participating units of one example embodiment.

FIG. 1 shows a block diagram of one embodiment of the disclosure. The coordination and sequence control of individual program units 110a, 110b, 110c, 110d which can be written in the same or in different programming languages are performed by a central management unit 100. For this purpose, individual program units can initially register (connections 102) on this management unit 100 via an associated adapter which is present as an interface for each of the program languages that are used and can thus be defined as an available program resource. The management unit 100 can then perform the registration of the required commonly used variables or data objects together with the registration 102 of the program units or separately therefrom. To do this, each program unit 110a, 110b, 110c, 110d can report the variables that it uses to the management unit 100, for example following a query from the management unit or in a predefined sequence. Said management unit then generates (or removes) (connections 104) the respective variables in a shared data memory 140 and reports back the registered variables or the variables and an associated identifier to all registered program units, so that the individual program units 110a, 110b, 110c, 110d are then able to obtain read and/or write access to these variables in the common data memory 140.

Program units or sequences from a plurality of program units can be executed following a configuration of this type. To do this, in one embodiment, the management unit 100 can directly control the execution of one or more program sequences. It can also form execution units 120, 130 which in each case contain a subset of program units and an associated configurable order of execution. The different program units can be written in the same or in different languages; user-specific or system-specific program units, for example can similarly be used. In particular, program units can be used which are written in domain-specific languages (DSL) and are functionally freely programmable. An execution unit can thus, for example, be responsible in a control for the sequential calling of the different program units or instances of program units defined therein, such as, for example, movement control, kinematics, fieldbus drivers, etc.

As shown in FIG. 1, a plurality of instances of program units can be executed, for example, successively in a sequence in a first execution unit 120. The units that are used can be chosen from the set of registered program units and can be executed successively according to the configured sequence. An instance of the program unit 110d, for example, is thus first executed, and then the execution unit initiates the execution of a further instance of the unit 110d, and then, as shown, for example, instances of the program units 110b, 110c and 110a. Fewer or more program instances than are shown here can also be used; the execution according to the sequence is continued by the execution unit 120 until the last configured program unit (unit 110a) is reached.

It is possible to specify both the maximum runtime of all execution units and the runtimes of individual program units by means of the management unit. It is optionally also possible to monitor the complete execution of a program unit within a sequence or execution unit and to instigate specific measures if the program unit has not been completely executed, e.g. by repeating a specific part of a sequence or by waiting until the execution was successful.

The execution of system-specific program units such as motion, kinematics, fieldbus drivers, etc., is performed via the scheduler. All user-specific program units are further executed by means of the scheduler. Dialogues are developed in a newly developed interface for the configuration and visualization.

Further program units can also be dynamically registered 102 in runtime. Optionally, the valid variables and identifiers can also be communicated to newly registered program units directly during or following the registration in order to permit access to the common data memory 140.

Newly added or already previously registered independent program units can similarly be inserted dynamically in runtime into a newly generated or already existing execution unit. To do this, it is only necessary for them to be previously registered on the management unit and therefore to be available. An execution unit 130 with two instances of different or identical program units 110d, for example, can already be defined by means of the management unit, the execution of which may already have been started. A further program unit 110c can then be inserted 132 if required between the two units already defined, which is also possible in runtime. This specialization of the program unit is performed via a parameterization. The execution unit can freely adapt the configured sequence of the program units accordingly. The execution units or program sequences can therefore be dynamically modified and supplemented by the management unit through use of the registered program units. The chosen example is obviously intended only to illustrate the principle, and any number of program instances, also e.g. at different times or in different execution units, can be inserted or added.

In one embodiment, the instantiated program units can initially act independently from one another, i.e., in this variant, a fault in one program unit has no impact on another program unit. In further embodiments, it is possible to form groups consisting of a plurality of program units which, for example, together form a specific movement sequence of an actuator. This is particularly appropriate if an application at least partially necessitates dependencies between a plurality of program units and therefore a higher integrity of the program units is intended to be achieved. These groups can in each case then act again as a single program unit.

In a further embodiment, heterogeneous, independent program units can be coordinated by designing a fixed command sequence for the coordination. As described above, the program units to be coordinated can be defined as related groups or can be addressed dynamically for the coordination. A group can act as a homogeneous program unit, i.e. a fault in one program unit can be interpreted as a fault in the group. A command sequence consisting of a begin command (begin), an execution command (execute) and an end command (end) can be formed, said sequence being run cyclically for a plurality of program units to be coordinated.

Figure 2:
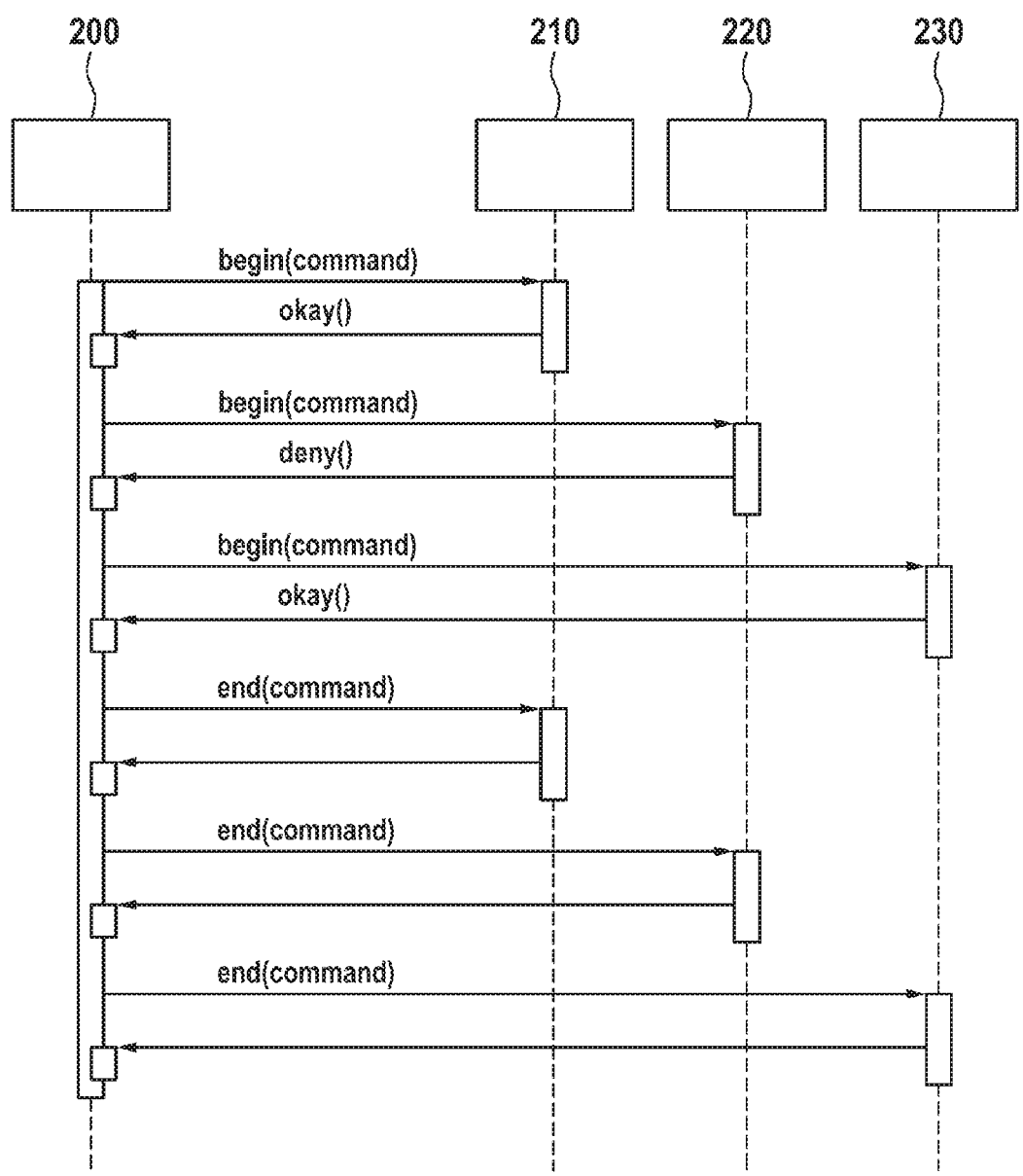
FIG. 2 shows a sequence diagram for the coordination of a plurality of program units according to one example embodiment.

FIG. 2 shows a first example of a sequence diagram for a cycle in which one of three program units to be coordinated denies the execution of a command. The performance of the sequence shown is to be understood chronologically from top to bottom. A begin command for the command to be executed in this sequence, begin(command), is first transmitted by the coordinating execution unit 200 to each of the program units 210, 220, 230. The command to be executed can be indicated, for example, as an argument of the begin command. As soon as one unit has received the begin command, it can transmit a predefined response back to the execution unit (or to any other unit which coordinates the current program sequence). The begin command thus enables the coordinated program units to respond positively to or deny a pending execution of a command.

The program units can preferably be addressed sequentially after one another. The begin command is therefore first transmitted to the first program unit 210 which, in the present case, signals back the readiness for execution by means of a corresponding confirmation message okay( ). After this response has been received, the begin command is transmitted by the execution unit 200 to the second participating program unit 220. In the present example, the execution is denied by the second program unit 220, this being signaled by the return transmission of a corresponding denial message deny( ). The begin command can then also be transmitted to the third participating program unit 230 and the corresponding response can be received.

The denial by at least one of the program units to be coordinated can then ensure that the command execution is terminated without further steps. This is communicated to all participating program units through the transmission of an end command end(command) for the command to be executed. A response to the end command is not required, but could optionally be provided. The execution sequence is thus ended for this command and a further command can be initiated.

Figure 3:
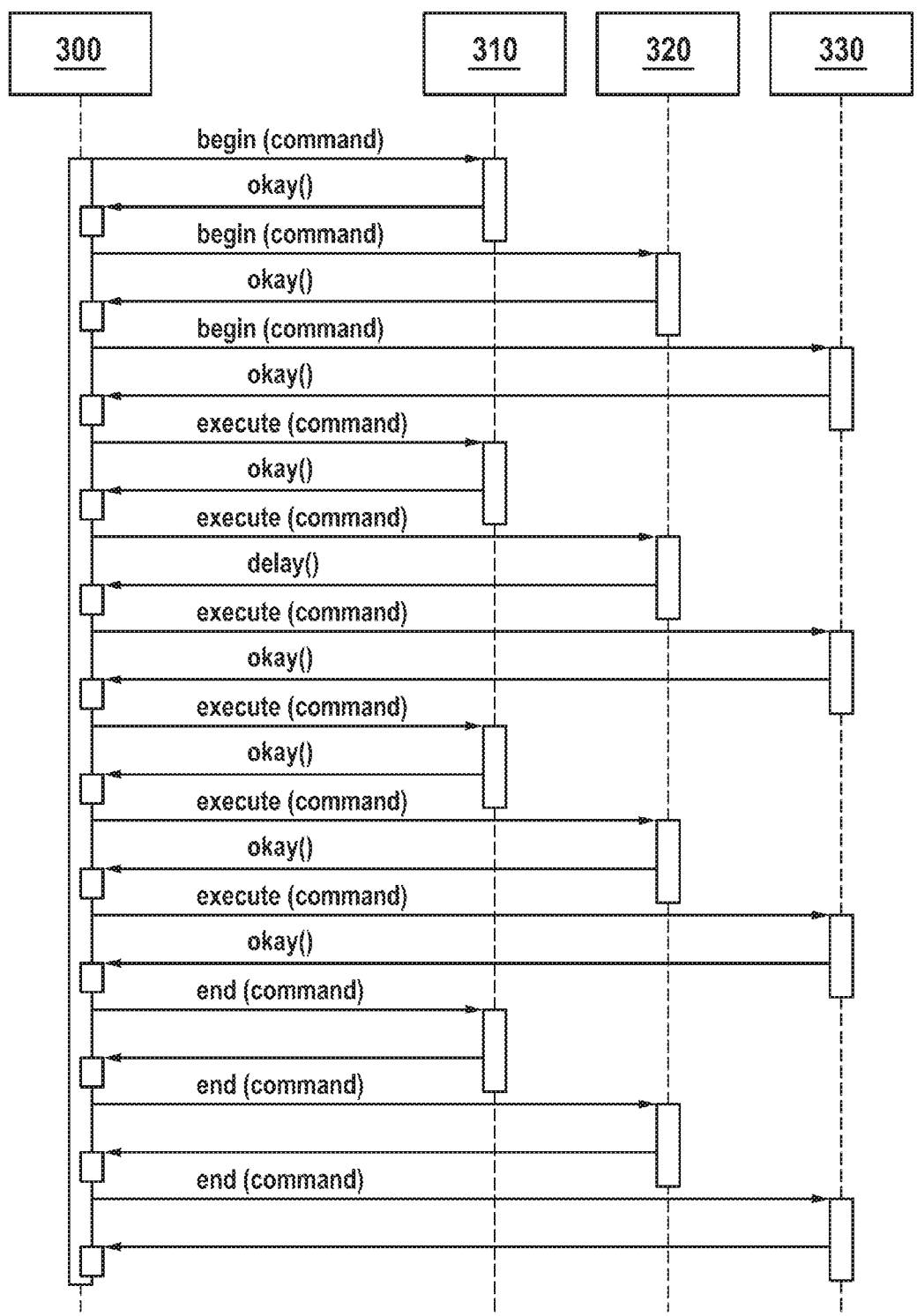
FIG. 3 shows a sequence diagram for the coordination of a plurality of program units according to a further example embodiment.

FIG. 3 shows an example of a sequence diagram with a delay triggered by a program unit. The planned command execution is first announced once more to all participating program units by means of a begin command begin(command) specifying the respective command. Following each transmitted begin command, one of the possible responses is transmitted by the program unit. In contrast to the example from FIG. 2, all three participating program units now signal the positive readiness to execute the command by means of a confirmation message, okay( ).

Since no program unit has denied the execution and the necessary confirmation has been received from all units, an execution command execute(command) next follows for the command to be executed which instructs the actual execution or processing of the command in the individual program units 310, 320, 330. Here also, a response is transmitted back by each program unit. In the present example, the first program unit executes the corresponding command and finally immediately transmits a confirmation message okay( ) once more.

The second program unit 320 in this example can transmit a delay message, delay( ) as a response. This message can indicate that the processing of the command is not currently possible or is not possible within a predefined time period for the responding program unit. The execution command execute is then also transmitted to the third program unit 330 also and a corresponding return response is awaited.

Since a timely execution was not therefore possible for all program units in the preceding step, this step is repeated for all program unit 310, 320, 330 so that an execution command is again transmitted and the response of each program unit is in each case received.

The execution command execute(command) can be invoked cyclically until all program units have successfully completed the execution. The end command can then be transmitted again to all program units. This end command is preferably always executed and signals the synchronized ending of the command for all participating program units.

It is optionally also conceivable that, along with a confirmation or a delay of the command, a denial of the command is also permitted in response to the execution command so that, with a corresponding response of a program unit, the execution is ended by the end command.

In example embodiments, the detailed design of the command sequence could further be different depending on the command to be executed; for example, specific commands could be provided in which a termination or a denial is permitted in the execution phase, whereas, in a different group of commands, no termination is possible, but instead the cyclical repetition of the execution command is continued until the execution is correctly completed. The time period, for example, which is provided for the execution of a command and which decides whether a program unit responds with a delay message could further be defined for different groups of commands or separately for each individual command. In one variant, along with individual commands, a predefined group of commands could also be used as an argument of the command sequence so that, on invocation by the start command, the entire command group is initialized for execution.

Commands can, for example, be predefined in the system for different functionalities. Similarly, it is also possible for the existing commands to be extended by the program units. For this purpose, each program unit registered on the management unit can register one or more commands by transmitting a corresponding registration. Optionally, as with the registration of variables, the management unit can communicate the newly registered commands to all registered program units. The program units can then trigger the execution of any command via the command sequence as described in FIG. 2 or 3.

An interlocking of the commands in the program unit is not required, since the commands are executed sequentially by the management unit or execution units.

The embodiments described can be used, for example, in a wide range of different controllers.

A first program unit, for example, can copy fieldbus data from special hardware, e.g. an FPGA, into the local memory and can process the data in such a way that they can be used by other program units. A program unit of this type could typically be programmed in C/C++.

A second program unit can then access input and output data of the fieldbus devices and, for example, check whether an input (e.g. limit switch) has been set, and, if necessary, set an output, e.g. a signal light. This program unit can typically be programmed in SPS (IEC 61131-3). A third program unit can then access the data of complex fieldbus devices (for example drives) and can process them (e.g. weighting) for downstream program units. This program unit can typically be programmed in C/C++.

Further—instantiated—program units can then calculate new setpoints for their respective dataset (drive) for the respective further movement, for example using complex control algorithms. This program unit can also be provided by third parties and could have been designed, for example, in Matlab and generated according to C. These program units can all be combined into a single program sequence, or can also be divided up into a plurality of program sequences. The programming languages and program units specified here are also obviously only example variants which can be replaced by others as required.

What is claimed is:

1. A method for executing heterogeneous program units of a program for controlling an automated system, comprising:
   forming an execution unit using a central management unit, the execution unit including a program sequence of a plurality of instances of the heterogeneous program units, the heterogeneous program units chosen from a set of the heterogeneous program units which are registered on the central management unit prior to formation of the execution unit; and
   controlling the automated system by executing each of the plurality of instances of the heterogeneous program units of the execution unit sequentially in order according to the program sequence.

2. The method according to claim 1, wherein:
   the heterogeneous program units are written in at least two different programming languages;
   each of the heterogeneous program units is configured to access variables in a common data memory; and
   the variables in the common data memory are created by the central management unit.

3. The method according to claim 2, further comprising:
   receiving at least some of the variables from one of the registered heterogeneous program units, wherein the variables in the common data memory are created based upon the received at least some of the variables.

4. The method according to claim 1, further comprising:
   inserting a further program unit into the formed execution unit without modifying the plurality of instances of the heterogeneous program units to form a modified execution unit; and
   executing the modified execution unit.

5. The method according to claim 1, further comprising:
   coordinating a command execution in the plurality of instances of the heterogeneous program units of the execution unit by transmitting a respective begin command to each of the plurality of instances of the heterogeneous program units; and
   ending the command execution when at least one of the plurality of instances of the heterogeneous program units denies the command execution.

6. The method according to claim 5, further comprising:
   cyclically repeating transmission of the respective begin commands until a confirmation message relating to the command execution has been received from each of the plurality of instances of the heterogeneous program units.

7. The method according to claim 5, further comprising:
   transmitting a respective end command to each of the plurality of instances of the heterogeneous program units when the command execution is ended or the command execution has been successfully executed.

8. The method according to claim 5, further comprising:
   registering the respective begin command for each of the plurality of instances of the heterogeneous program units on the central management unit.

9. The method according to claim 1, wherein a computing unit is configured to carry out the method.

10. The method according to claim 9, wherein a computer program causes the computing unit to carry out the method when the computer program is executed on the computing unit.

11. The method according to claim 10, wherein the computer program is stored on a non-transitory machine-readable storage medium.

* * * * *